United States Patent
Ball

(10) Patent No.: US 6,447,018 B1
(45) Date of Patent: Sep. 10, 2002

(54) BOLTLESS PIPE CONNECTOR

(75) Inventor: Daniel Graham Ball, Darlington (GB)

(73) Assignee: Gloway International, Inc., Tortola (VG)

( * ) Notice: Subject to any disclaimer, the term of this patent is extended or adjusted under 35 U.S.C. 154(b) by 0 days.

(21) Appl. No.: 09/463,543

(22) PCT Filed: Jul. 20, 1998

(86) PCT No.: PCT/GB98/02159

§ 371 (c)(1),
(2), (4) Date: Jan. 21, 2000

(87) PCT Pub. No.: WO99/05442

PCT Pub. Date: Feb. 4, 1999

(30) Foreign Application Priority Data

Jul. 22, 1997 (GB) .............................. 9715483

(51) Int. Cl.$^7$ ................................. F16L 17/00
(52) U.S. Cl. ........................................ 285/96; 285/106
(58) Field of Search ..................... 285/96, 105, 106; 277/605, 625, 627

(56) References Cited

U.S. PATENT DOCUMENTS

| 1,800,085 A | * | 4/1931 | Kroeger et al. | 277/625 X |
|---|---|---|---|---|
| 1,984,806 A | | 12/1934 | Pfefferle | |
| 2,508,914 A | * | 5/1950 | Graham | 285/105 |
| 2,991,092 A | * | 7/1961 | MacKay | 277/625 |
| 3,582,112 A | | 6/1971 | Pico | 285/96 |
| 3,843,167 A | | 10/1974 | Gronstedt | |
| 3,844,313 A | | 10/1974 | Arnold | |
| 3,860,270 A | * | 1/1975 | Arnold | 277/625 |
| 3,899,183 A | * | 8/1975 | Wild et al. | 277/625 X |
| 4,146,254 A | * | 3/1979 | Turner et al. | 285/105 |
| 4,381,114 A | * | 4/1983 | Vanderford, Jr. | 285/96 X |
| 4,955,641 A | | 9/1990 | Dent | |
| 5,863,078 A | | 1/1999 | Ball | 285/24 |
| 5,911,447 A | | 6/1999 | Ball | 285/105 |

FOREIGN PATENT DOCUMENTS

| DE | 1 282 373 | 11/1968 |
|---|---|---|
| DE | 2 247 804 | 4/1973 |
| EP | 0 727 026 | 8/1996 |
| WO | WO 95/09318 | 4/1995 |

* cited by examiner

Primary Examiner—Greg Binda
(74) Attorney, Agent, or Firm—Klarquist Sparkman, LLP

(57) ABSTRACT

A connector for a plain end pipe comprising a housing (7) for location over the pipe, an annular recess (4) formed in an inner surface of the housing (7), a seal (1) located in the recess (4), a nipple (8) for the supply of grease under pressure, and segmental grippers of L-shaped cross section comprising a leg (6) and a foot (5) having a serrated inner surface for engagement with the pipe. Such connectors have wide tolerance within a certain range of nominal pipe outside diameter.

8 Claims, 2 Drawing Sheets

BOLTLESS PIPE CONNECTOR

DESCRIPTION

Technical Field

The invention relates to boltless pipe connectors suitable for attachment on or adjacent the end of a plain end pipe to enable coupling of said pipe to a further pipe, pump, valve, end cap or the like. These connectors are universal, that is they have a wide tolerance within a certain size range: pipes of a given nominal diameter do not all have the same outside diameter.

EP 727026 uses grease under pressure to grip and seal pipes as they are joined. This technology has been limited to small tolerances, typically 4 or 5 mm, in pipe diameter. The maximum movement of the grippers is approximately half thickness of the grippers or they would slip out of the container groove in the housing.

In the connector described and shown in the present application, a seal located in an annular recess in an inner surface of the connector has segmental grippers of L-shaped cross-section comprising a leg between the seal and a wall of the recess, and a foot having a serrated inner surface for engagement with the pipe. This allows for a tolerance exceeding 10 or 15 mm thereby allowing the pipe connection to be used with all pipes of a given nominal diameter.

A metal shim may be provided between the legs of the adjacent grippers. Grippers may be provided between one or each side of the seal and an adjacent wall of the recess. The housing is provided with an inlet for a sealing fluid which may be a nipple for the supply of grease or oil under pressure or components for the formation of an epoxy resin to make the seal permanent. The housing is generally provided with an air bleed offset from the sealing fluid inlet for use during assembly when the recess is filled with grease or oil as sealing fluid.

DRAWINGS

Figure 1:
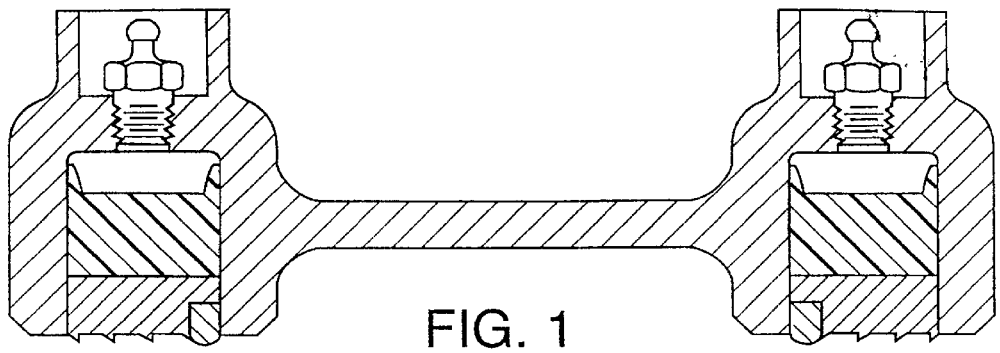
FIG. 1 is a half-section of the pipe connector according to the above EP 727026.

In the prior art connector of FIG. 1, a mechanism using high pressure grease activates a plurality of grippers. The grippers are pushed downward onto the pipe by grease from a high pressure grease gun but contained within the connector housing to cause a dynamic seal to press the arcuate segment shaped grippers onto the pipe.

DETAILED DESCRIPTION OF PREFERRED EMBODIMENTS

Figure 2:
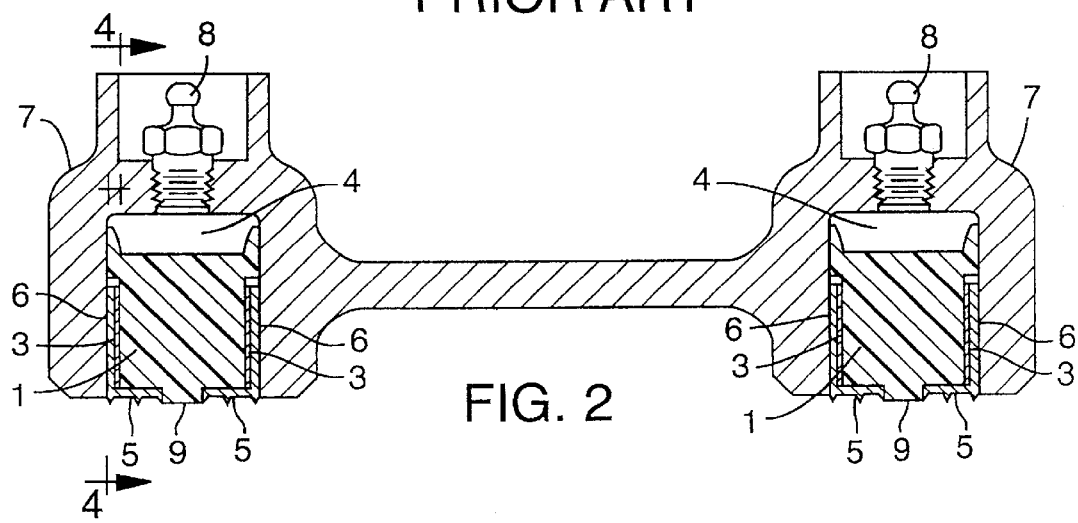
FIG. 2 is a section through a pipe connector according to one embodiment of the present invention.
Figure 3:
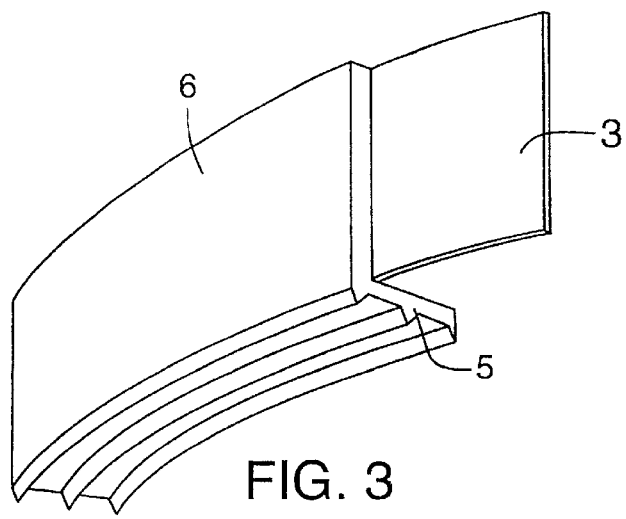
FIG. 3 shows the configuration of a gripper and shim in FIG. 2.
Figure 4:
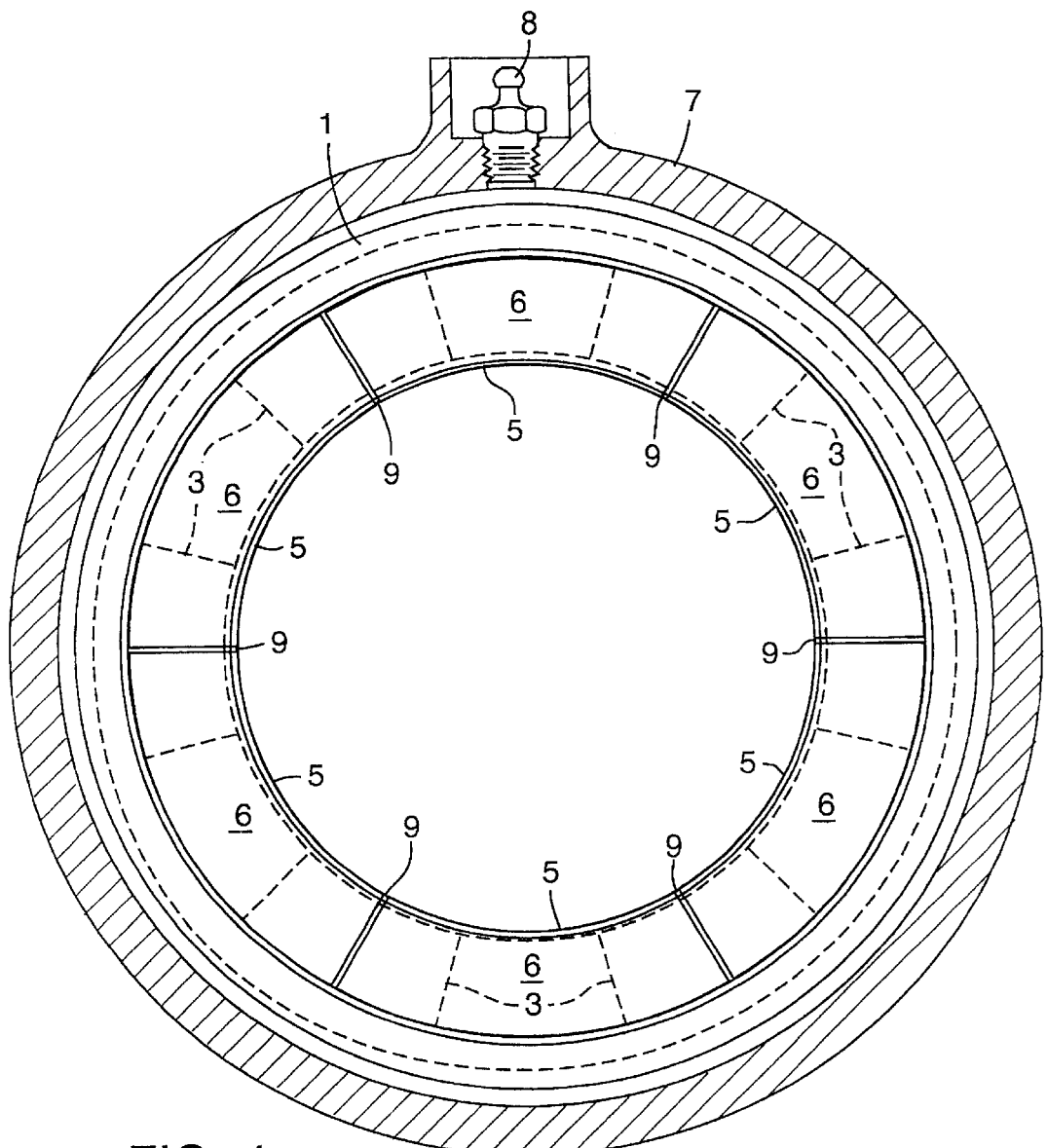
FIG. 4 is a sectioned end view of the pipe connector, the section being taken at 4—4 in FIG. 2 and revolved about the central axis.

Referring to FIG. 2, the connector comprises a hollow metal housing 7 having an annular recess 4. In the recess 4, there is an annular polymeric seal 1 having a concave outer surface and lateral wings in sealing engagement with the inside of the recess 4. Segmental grippers of L-shaped cross-section each comprise a leg 6 contacting the seal 1 through metal shims 3 and a foot 5 having a serrated inner surface for engagement with a pipe wall. As shown in FIG. 4, the metal shims 3 extend across the gaps between the legs 6 of the adjacent grippers to allow relative movement therebetween on sealing.

During assembly, grease is applied at pressure through a nipple 8 to fill the recess 4. Air is allowed to escape through a bleed (not shown). On installation, more grease is applied at high pressure from a gun through the nipple 8 and presses the seal 1 downward so that the grippers are brought into engagement with the pipe wall, the air bleed being closed at this stage.

This allows a greater tolerance in each pipe connector because the leg 6 of the gripper prevents the polymer seal 1 from protruding into the gap between the housing 7 and the pipe wall. The grease presses downward on the seal 1 and on its wings to ensure firm contact with housing 7. As the grease pressure increases, it moves the polymer seal 1 down the housing 7 towards the pipe wall. The polymer seal 1 presses on the feet 5 of the grippers to move them onto the pipe wall. The pressure of the grease causes the feet 5 to cut into the pipe wall. The gap between the gripper feet 5 allows the polymer seal 1 to flow onto the surface of the pipe and form a seal 9 which prevents any leaks along the outer surface of the pipe wall.

The metal shims 3 prevent nipping of the seal 1 between the legs 6 of the grippers, and protruding between the edges of adjacent gripper legs 6.

What is claimed is:

1. A pipe connector for a plain end pipe comprising
    a housing for location over the pipe, an annular recess formed in an inner surface of the housing to surround the pipe,
    a seal located in the recess, and
    an inlet for the supply of sealing fluid into the recess between the housing and the seal, characterized by
    segmental grippers of L-shaped cross-section comprising a leg between the seal and a wall of the recess, and a foot having a serrated inner surface for engagement with the pipe.

2. A pipe connector according to claim 1 characterized by a metal shim between the legs of adjacent grippers.

3. A pipe connector according to claim 2 characterized by grippers between each side of the seal and an adjacent wall of the recess.

4. A pipe connector according to claim 3 characterized by the inlet being a nipple for the supply of grease under pressure.

5. A pipe connector according to claim 2 characterized by the inlet being a nipple for the supply of grease under pressure.

6. A pipe connector according to claim 1 characterized by grippers between each side of the seal and an adjacent wall of the recess.

7. A pipe connector according to claim 6 characterized by the inlet being a nipple for the supply of grease under pressure.

8. A pipe connector according to claim 1 characterized by the inlet being a nipple for the supply of grease under pressure.

* * * * *